Patented Nov. 28, 1950

2,532,245

UNITED STATES PATENT OFFICE 2,532,245

THERMOPLASTIC COMPOSITIONS WITH REDUCED FLOW VISCOSITY

Eugene D. Serdynsky, Midland, Mich., assignor to The Dow Chemical Company, Midland, Mich., a corporation of Delaware No Drawing. Application August 26, 1949, Serial No. 112,640

7 Claims. (Cl. 260—23)

This invention relates to new thermoplastic molding and extrusion compositions, and particularly to such molding and extrusion compositions comprising the polymer or crystalline copolymers of vinylidene chloride and an agent to reduce the viscosity of the polymer at fabrication temperatures.

It has long been recognized that, in the molding of organic thermoplastic compositions, it is necessary to employ agents to facilitate the release of the shaped article from the mold. In the extrusion of organic thermoplastics, it has also been found desirable, and is standard practice, to employ agents to facilitate the flow of plastic through the extrusion orifice. Various types of agents have been proposed for both of the above-suggested purposes. Some of the common modifiers are stearic acid and its alkyl esters; the ester type waxes, including beeswax, carnauba wax, and the like; and such hydrocarbon products as paraffin wax and paraffin oil, as well as numerous compounds generically called "plasticizers." Each of the agents proposed has, of course, been of some value in attaining the desired object. For instance, each of them may cause a slight lowering of the flow viscosity, and a small increase in the extrusion rate of organic thermoplastic compositions.

By lowering the flow viscosity, a plasticized composition is exposed, for a shorter period of time, to the decompositional effects of heat in the extruder. Therefore, a sizable lowering in the flow viscosity of a plasticized composition, due to the addition of a "flow agent," results both in a corresponding increase in the extrusion rate and in an improved plastic product. Similarly, in injection molding, a substantial lowering in the flow viscosity of a plasticized composition, results in a larger number of more accurate and well-defined moldings than that obtained over the same time from a similar composition which does not have an effective flow agent added to it. Because of their susceptibility to decomposition on prolonged heating, polymeric vinylidene chloride and its crystalline copolymers have a particular need for viscosity-lowering modifiers. It is an object of this invention to provide certain flow agents which, when incorporated in small amounts in compositions comprising the polymer and crystalline copolymers of vinylidene chloride, increase greatly the rate of flow of the composition during molding and extrusion. Another object is to provide molding and extrusion compositions comprising the polymer and crystalline copolymers of vinylidene chloride and such a flow agent, which compositions can be molded or extruded rapidly. Other objects will be apparent from the following description of the invention.

According to the present invention, the foregoing objects may be attained by employing lithium stearate and mixtures of lithium stearate with pentaerythritol monostearate, in amounts of from 0.1 to 5.0 per cent by weight, as flow agents for compositions comprising the polymer and crystalline copolymers of vinylidene chloride. Such crystalline polymeric products contain at least 70 per cent by weight of vinylidene chloride and often 85 per cent or more in the polymer molecule. A flow agent, containing about 40 to 60 per cent of lithium stearate and about 60 to 40 per cent of pentaerythritol monostearate, is especially effective in such a polymeric composition.

By way of example, about 86 parts by weight of a copolymer composed of about 85 per cent vinylidene chloride and about 15 per cent vinyl chloride was plasticized and stabilized with about 8 parts of di(α-phenylethyl) ether, about 3 parts of salol, and about 3 parts of sodium pyrophosphate. This standard composition served as a blank in a series of determinations made with compositions containing various flow agents in various amounts. The following table summarizes the results of the data obtained. The first column, labeled "Compositions," represents the above-defined blank, with or without a proportionate amount of various flow agents, as indicated. The second column gives the "Flow Viscosity" of the various test compositions, in centipoises. All values were obtained under identical conditions on a standard parallel plate plastometer. A high "Flow Viscosity" indicates an undesirably high resistance to flow and a low value indicates a more desirable rate of flow. The third column, labeled "Extrusion Rate," represents the number of pounds of each composition which could be extruded per hour under identical conditions, through the same orifice of the same small extruder. A high "Extrusion Rate" indicates ease of flow, and a low one indicates resistance to flow. The fourth column gives the "K-value" (see footnote below) of the various test compositions. This is a measure of the effectiveness of each flow agent, added to the blank composition, in reducing the melt viscosity of that composition. A K-value of about 0.1 is obtained by the addition of any of the usual plasticizers to the blank composition. A K-value of about 0.2 to 0.25 is obtained

---

FOOTNOTE.—The "K-value" is derived from the following equation:

$$\log N_f = \log N_0 - K_s B$$

where $N_0$ is the melt viscosity of the blank composition
 $N_f$ is the melt viscosity of the blank composition plus "flow agent"
 $B$ is the per cent flow agent added to the blank composition
 $K_s$ is the constant that denotes the effectiveness of the flow agent in reducing melt viscosity.

It is evident from the above equation that $K_s$ assumes a value of zero when no flow agent is added to the blank composition, as $N_f = N_0$ and $B = 0$.

by the addition of lubricants, such as, the common waxes and soaps. A K-value of 0.45 or above is considered to be evidence of highly desirable flow characteristics.

Table

| Compositions | Flow Viscosity | Extrusion Rate | K-value |
|---|---|---|---|
| Blank | 6,150 | 5.0 | 0 |
| Blank+2% pentaerythritol monostearate | 3,850 | 9.9 | 0.21 |
| Blank+2% lithium stearate | 500 | 10.4 | 0.51 |
| Blank+{1% pentaerythritol monostearate, 1% lithium stearate} | 140 | 15.1 | 0.50 |

The above table reveals an unusual and unexpected improvement over the blank composition by the introduction of the various flow agents. The addition of 2 per cent by weight of pentaerythritol monostearate to the blank composition showed a reduction of flow viscosity to 63 per cent of the blank and an increase of about 98 per cent in the extrusion rate. The K-value of 0.21, resulting from the addition, indicated an improvement only such as is expected from the addition of common plasticizers. The thermal stability of the blank composition was not affected by the introduction of the pentaerythritol monostearate as was shown by a standard test. The addition of 2 per cent by weight of lithium stearate to the blank composition showed an unexpected reduction of the flow viscosity to about 8 per cent of that of the "blank," and about 108 per cent increase in the extrusion rate. A change in the K-value of from zero to 0.51, resulting from the addition, indicated a tremendous effectiveness in reducing melt viscosity of the composition since a value of 0.54 is the maximum K-value obtained with all compositions tested, including a large number not pertinent here. The thermal stability of the blank composition was substantially unaffected by the introduction of lithium stearate. The addition of a mixture composed of equal parts of pentaerythritol monostearate and of lithium stearate to the blank composition showed an unusual and most unexpected improvement in the flow viscosity, which was about 2 per cent that of the "blank," and about 210 per cent increase in the extrusion rate. A change in K-value of from zero to 0.50, resulting from the addition, indicated an effectiveness in reducing melt viscosity substantially the same as that observed with lithium stearate alone. The thermal stability of this composition was comparable with that of the blank.

Since lithium is a member of the alkali metal family, another member, namely sodium, was chosen to determine if its stearic acid salt would be as effective a flow agent as lithium stearate. To a blank composition comprising a copolymer of vinylidene chloride and vinyl chloride, 2 per cent by weight of sodium stearate was added. This new composition had a flow viscosity of 2850 centipoises. As a comparison, 2 per cent of lithium stearate was added to another sample of the same blank composition and a flow viscosity of 2100 centipoises was noted under identical experimental conditions. The composition containing lithium stearate showed a surprising improvement of about 26 per cent in flow viscosity over the composition containing sodium stearate. The K-value of the composition containing lithium stearate was about 0.54 while that of the sodium stearate composition was only 0.38.

Any molding and extrusion compositions comprising crystalline polymeric vinylidene chloride products have similarly improved flow characteristics when a small amount of lithium stearate is added to the compositions. The addition of a small amount of a mixture of lithium stearate and pentaerythritol monostearate to such compositions shows even better flow characteristics than the addition of lithium stearate alone. Thus, moldings and extrusions of compositions containing crystalline polymeric vinylidene chloride products and the above flow agents are remarkably facilitated.

I claim:

1. A composition of matter comprising a material selected from the group consisting of the polymer and crystalline copolymers of vinylidene chloride, and as a flow agent therefor, from about 0.1 to 5.0 per cent by weight of lithium stearate.

2. A composition of matter comprising a crystalline copolymer of vinylidene chloride and vinyl chloride and as a flow agent therefor, from about 0.1 to 5.0 per cent by weight of lithium stearate.

3. A composition of matter comprising a material selected from the group consisting of the polymer and crystalline copolymers of vinylidene chloride, and as a flow agent therefor, from about 0.1 to 5.0 per cent by weight of a mixture containing about 40 to 60 per cent by weight of lithium stearate and about 60 to 40 per cent by weight of pentaerythritol monostearate.

4. A composition of matter comprising a crystalline copolymer of vinylidene chloride and vinyl chloride and as a flow agent therefor, from about 0.1 to 5.0 per cent by weight of a mixture containing about 40 to 60 per cent by weight of lithium stearate and about 60 to 40 per cent by weight of pentaerythritol monostearate.

5. A composition of matter comprising a crystalline copolymer of vinylidene chloride and vinyl chloride and as a flow agent therefor, about 2 per cent by weight of lithium stearate.

6. A composition of matter comprising a crystalline copolymer of vinylidene chloride and vinyl chloride and as a flow agent therefor, about 2 per cent by weight of a mixture containing about 40 to 60 per cent by weight of lithium stearate and about 60 to 40 per cent by weight of pentaerythritol monostearate.

7. A composition of matter comprising a crystalline copolymer of vinylidene chloride and vinyl chloride and as a flow agent therefor, about 2 per cent by weight of a mixture containing about equal weights of lithium stearate and of pentaerythritol monostearate.

EUGENE D. SERDYNSKY.

REFERENCES CITED

The following references are of record in the file of this patent:

UNITED STATES PATENTS

| Number | Name | Date |
|---|---|---|
| 2,446,976 | Cousins | Aug. 10, 1948 |